Patented May 8, 1934

1,957,484

UNITED STATES PATENT OFFICE

1,957,484

PURIFICATION OF ORGANIC BODIES

Adolph Zimmerli and Robert C. Lyon, New Brunswick, N. J., assignors, by mesne assignments, to E. I. du Pont de Nemours & Company, a corporation of Delaware No Drawing. Application May 27, 1931, Serial No. 540,499

11 Claims. (Cl. 202—46)

This invention relates to purification of normally solid organic substances by distilling with steam. In its more specific aspect this invention relates to a process of purifying quinone by distilling the same with steam at reduced pressure.

In our U. S. Patent No. 1,883,284, issued October 18, 1932, we have described a method of purifying quinone by distilling the reaction mass in which quinone is produced and which contains considerable quantities of water, at a temperature of about 50° to 60° C. and under a vacuum of about 27 inches. The distilled vapors are condensed to give a saturated aqueous quinone solution containing crystals of quinone which may be separated by filtration. While the above process constitutes a most economical method for the recovery of pure quinone from its crude state, it suffers from the drawback that the condensed quinone tends to form a cake on the condensing surface, thereby impairing the heat transfer.

It is accordingly an object of this invention to improve the process of steam distillation of quinone whereby to avoid the troubles of caking in the condenser.

Other and further important objects of this invention will appear as the description proceeds.

We have found that the above drawback can be avoided by adding to the mixture of crude quinone in water an organic solvent for quinone which is immiscible with water, and which is in itself volatile with steam. The presence of the organic solvent in the distillate prevents the quinone from settling and caking upon the walls of the condenser. The distillate separates into two layers—an aqueous layer and an organic solvent layer—each of which contains quinone dissolved therein. The pure quinone may then be recovered from these solutions in any well-known manner.

The optimum proportion of organic solvent to be used depends on the solvent, and can be readily determined for each solvent by a little experimentation. Large proportions of the organic solvent are not detrimental, but if the quantity used is large enough to form a constant boiling mixture with water, less quinone will be carried over than would be the case with water alone. Consequently, the efficiency of the process suffers. On the other hand, too little organic solvent may not prevent completely the formation of cake in the condenser. The most economical proportion to be used, therefore, is that which is just sufficient to prevent the sticking of the crystals of quinone to the surface of the condenser. For best results, the organic solvent should be fed in gradually as the distillation proceeds. Thus, although the total quantity of solvent employed is about sufficient to dissolve all the quinone distilled over, its concentration in the boiling aqueous mixture is at no time large enough to form with water a constant boiling mixture. Another way of stating this, is that the solvent should be fed in at such a slow rate as would be insufficient at any time to saturate the space above the boiling liquid with the vapors of the solvent.

The following example will serve further to illustrate our invention, without, however, limiting the same. Parts given are parts by weight.

Example 90 parts of crude quinone, as obtained for instance, by oxidizing aniline with manganese dioxide in known manner, are suspended in 2000 parts of water in a closed vessel provided with a dropping funnel and connected through a condenser to a receiver, which in turn is connected to a vacuum pump. The vessel is heated to about 50° to 60° C., and a vacuum of about 24 to 26 inches of mercury is applied to the system. As the mixture in the vessel starts boiling, chlorobenzol is slowly dripped in through the dropping funnel, at such a slow rate that it is evaporated about as fast as introduced, and that a total of 800 parts are introduced during the course of the distillation. The vapors pass into the condenser, and being liquefied flow into the receiver. If any quinone begins to settle out in the condenser, the rate of supply of chlorobenzol is slightly increased, whereupon the sublimed quinone is immediately redissolved and carried into the receiver. The condensate separates into two layers. The upper, aqueous layer contains about 1% of quinone dissolved therein, while the lower, chlorobenzol layer contains about 10% of quinone. After separating the two layers in a separating column, the aqueous layer is extracted with fresh chlorobenzol, which may then be joined to the main chlorobenzol layer. The chlorobenzol-quinone solution is subjected to partial distillation to concentrate the same and to recover the bulk of the chlorobenzol. After about ⅔ of the latter have been distilled off, the concentrated solution is cooled to about 10° C. or lower, and the pure, yellow crystals of quinone separating are filtered off and dried with air. The yield of quinone is about 90% of the crude mass.

It will be understood that although we set forth our preferred mode of operation in great detail, our invention is not limited to such details. For instance, instead of chlorobenzol, any organic liquid which is a good solvent for quinone, immiscible with water, and volatile with steam may be used. Also, instead of introducing such liquid into the still, it may be introduced directly into the condenser.

It will be further understood that our novel method of purification is applicable to other organic compounds which have a high melting point, that is, above 100° C., and which are volatile with steam; for instance, camphor, benzoic acid, and the like, and which would otherwise offer difficulties in distillation due to their tendency to cake upon the surface of the condenser.

We claim:

1. The process of purifying quinone, which comprises steam distilling a crude quinone mass as obtainable in the manufacture of quinone under reduced pressure in the presence of an organic solvent for quinone which is immiscible with water but volatile with steam, and recovering quinone from the distillate.

2. The process of purifying quinone, which comprises steam distilling a crude quinone mass as obtainable in the manufacture of quinone under reduced pressure, while gradually feeding into the still an organic solvent for quinone which is immiscible with water but volatile with steam, and recovering quinone from the distillate.

3. The process of purifying quinone, which comprises steam distilling crude quinone under reduced pressure, while gradually feeding into the still an organic solvent for quinone which is immiscible with water but volatile with steam, said solvent being fed in at a rate insufficient to form within the still a constant boiling mixture with the water therein present.

4. The process of purifying quinone, which comprises steam distilling crude quinone under reduced pressure, while gradually feeding into the still an organic solvent for quinone which is immiscible with water but volatile with steam, said solvent being fed in at a rate insufficient to saturate the space above the boiling liquid with the vapors of said solvent.

5. The process of purifying crude quinone which comprises distilling the same with steam and in the presence of chlorobenzol under reduced pressure and at a temperature of about 50° to 60° C., separating the condensate into an aqueous layer and a chlorobenzol layer, and recovering quinone from the chlorobenzol layer.

6. The process of recovering an aromatic compound which melts above 100° C. and which is volatile with steam, from a crude mass of which said compound is the major organic constituent, which comprises steam distilling said compound and condensing the vapors in the presence of an added organic compound which is a solvent for the compound being purified but immiscible with water.

7. The process of recovering a terpene compound which melts above 100° C. and which is volatile with steam, from a crude mass of which said compound is the major organic constituent, which comprises steam distilling said compound and condensing the vapors in the presence of an added organic compound which is a solvent for the compound being purified but immiscible with water.

8. The process of recovering quinone from a crude mass of which it is the major organic constituent, which comprises steam distilling said mass and condensing the vapors in the presence of an organic liquid which is a solvent for quinone but immiscible with water.

9. The process of recovering benzoic acid from a crude mass of which it is the major organic constituent, which comprises steam distilling said mass and condensing the vapors in the presence of an organic liquid which is a solvent for benzoic acid but immiscible with water.

10. The process of recovering camphor from a crude mass of which it is the major organic constituent, which comprises steam distilling said mass and condensing the vapors in the presence of an organic liquid which is a solvent for camphor but immiscible with water.

11. The process of recovering an organic compound selected from the group consisting of aromatic compounds and terpene compounds, which melt above 100° C. and are volatile with steam, from a crude mass of which said compound is the major organic constituent, which comprises distilling said compound and condensing the vapors in the presence of an added organic compound which is a solvent for the compound being purified but immiscible with water.

ADOLPH ZIMMERLI
ROBERT C. LYON.